United States Patent
Tsukui

(10) Patent No.: US 10,277,762 B2
(45) Date of Patent: Apr. 30, 2019

(54) ELECTRONIC APPARATUS AND CONTROL METHOD

(71) Applicant: SEIKO EPSON CORPORATION, Tokyo (JP)

(72) Inventor: Shinobu Tsukui, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 15/466,690

(22) Filed: Mar. 22, 2017

(65) Prior Publication Data

US 2017/0289378 A1 Oct. 5, 2017

(30) Foreign Application Priority Data

Apr. 1, 2016 (JP) .................................. 2016-074037

(51) Int. Cl.
| | | |
|---|---|---|
| *G06K 15/00* | (2006.01) | |
| *H04N 1/00* | (2006.01) | |
| *G06F 3/12* | (2006.01) | |

(52) U.S. Cl.
CPC ......... *H04N 1/00891* (2013.01); *G06K 15/00* (2013.01); *H04N 1/00015* (2013.01); *H04N 1/00896* (2013.01)

(58) Field of Classification Search
None
See application file for complete search history.

(56) References Cited

U.S. PATENT DOCUMENTS

| | | | | |
|---|---|---|---|---|
| 2012/0257247 | A1* | 10/2012 | Yamasaki | .......... G06K 15/4055 358/1.15 |
| 2013/0201510 | A1* | 8/2013 | Miyata | .................. G06F 3/1278 358/1.13 |
| 2013/0214603 | A1* | 8/2013 | Tanaka | ...................... H02J 9/04 307/66 |
| 2014/0176975 | A1 | 6/2014 | Kobayashi et al. | |
| 2016/0196483 | A1 | 7/2016 | Kobayashi et al. | |

FOREIGN PATENT DOCUMENTS

JP 2014-124809 7/2014

* cited by examiner

*Primary Examiner* — Dov Popovici
(74) *Attorney, Agent, or Firm* — Workman Nydegger

(57) ABSTRACT

An electronic apparatus is provided that operates in a first state, a second state that consumes less energy than the first state, and a third state that consumes less energy than the second state. The electronic apparatus includes a switch that activates or cancels an automatic power-on function of the electronic apparatus, and a processor that shifts the electronic apparatus from the first state to the second state, in a case where, when the electronic apparatus is in the first state, a state transition condition for shifting the electronic apparatus to another state that consumes less energy than the first state is satisfied, and the automatic power-on function is active, and shifts the electronic apparatus from the first state to the third state, in a case where the state transition condition is satisfied and the automatic power-on function is inactive.

8 Claims, 2 Drawing Sheets

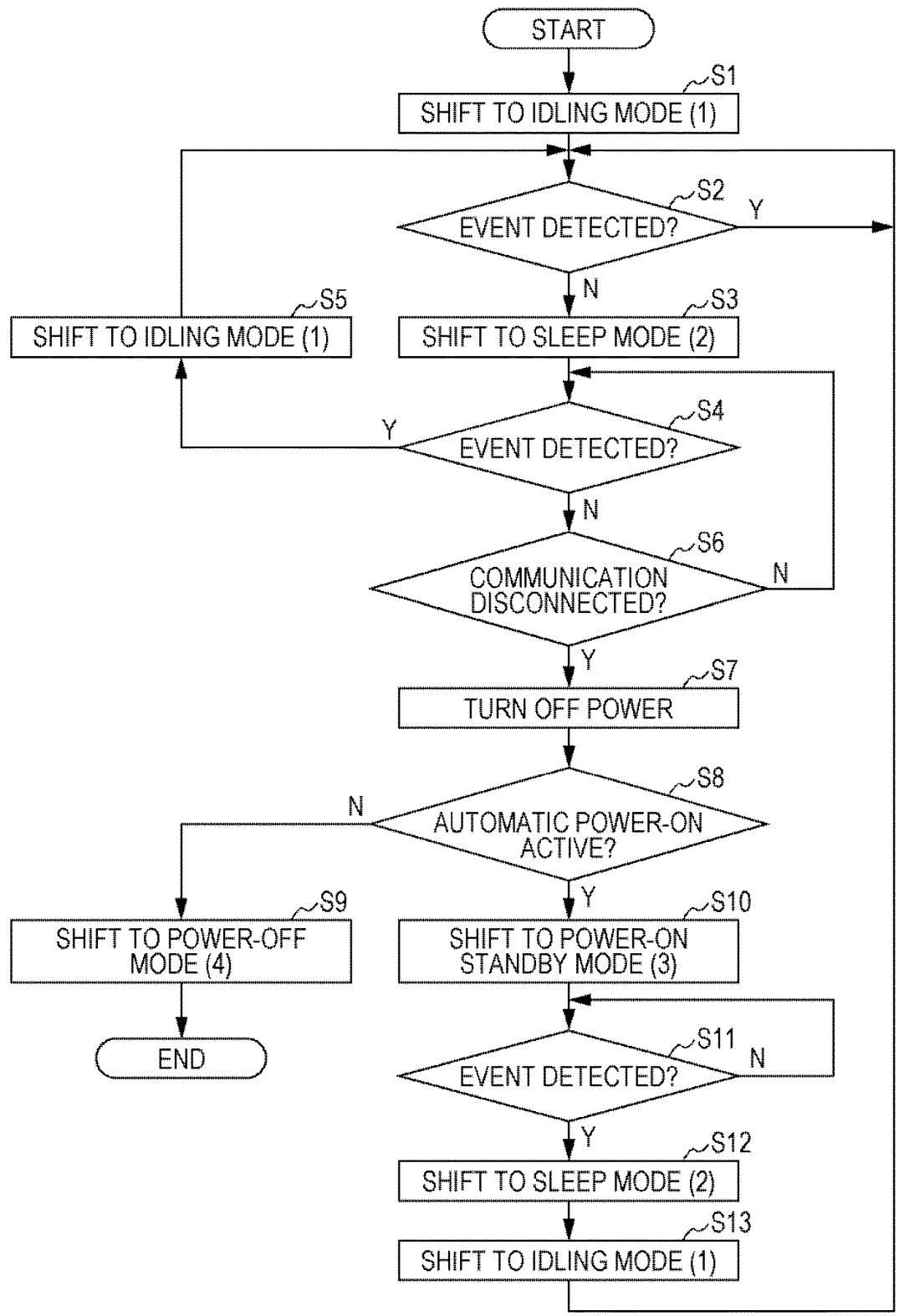

ELECTRONIC APPARATUS AND CONTROL METHOD

BACKGROUND

1. Technical Field

The present invention relates to an electronic apparatus and a control method.

2. Related Art

Image forming apparatuses having an energy-saving mode are known, for example as set forth in JP-A-2014-124809. Such an image forming apparatus is configured to cancel the energy-saving mode, for example upon receipt of a print instruction, and execute the printing operation.

Some of latest printers are equipped with an automatic power-off function. Such a printer is configured to shift to a power-off state when a certain condition is satisfied, for example when a predetermined time has elapsed. Some of latest printers are also equipped with an automatic power-on function. Such a printer assumes a standby state that consumes less energy than an ordinary energy-saving mode, while waiting for a printing request, and shifts, upon receipt of the printing request, to an idling mode and executes the printing operation.

Existing printers having both of the automatic power-off function and the automatic power-on function are configured to start the shifting to the power-off state, for example when a predetermined condition is satisfied in the standby state.

SUMMARY

An advantage of some aspects of the invention is to allow both of the automatic power-off function and the automatic power-on function to be properly activated.

In an aspect, the invention provides an electronic apparatus configured to operate in a normal mode and an energy-saving mode that consumes less energy than the normal mode, the electronic apparatus including a control unit. The control unit shifts to a first energy-saving mode when a second condition for shifting to the first energy-saving mode is satisfied after a first condition for shifting to a power-off state is satisfied, shifts to the power-off state when the second condition is not satisfied, maintains the first energy-saving mode without shifting to the power-off state even when the first condition is satisfied in the first energy-saving mode, and shifts to the normal mode when a third condition is satisfied in the first energy-saving mode. Such an arrangement allows the electronic apparatus to maintain the first energy-saving mode instead of starting the power-off operation in the first energy-saving mode.

The foregoing electronic apparatus may be configured to establish at least one communication connection, and the control unit may decide, as the first condition, whether all or one or more predesignated ones of the communication connections are disconnected. The mentioned configuration allows the electronic apparatus to attain a highly convenient function of shifting to the power-off state upon being disabled to receive processing requests such as a print instruction.

In the foregoing electronic apparatus, the control unit may decide, as the second condition, whether the setting of the first energy-saving mode is valid. The mentioned arrangement allows the electronic apparatus to properly perform the automatic power-on function (first energy-saving mode).

In the foregoing electronic apparatus, the control unit may decide, as the third condition, whether a request from an external apparatus or an operation made by a user. The mentioned arrangement allows the electronic apparatus to stand by for the request with low power consumption.

In the foregoing electronic apparatus, the control unit may shift to a second energy-saving mode that consumes less energy than the normal mode but consumes more energy than the first energy-saving mode, before shifting to the power-off state or the first energy-saving mode, and decide whether the first condition and the second condition are satisfied. The mentioned arrangement allows the electronic apparatus to make the decision with low-power consumption, before shifting to the first energy-saving mode or the power-off state.

The foregoing electronic apparatus may be configured to establish a plurality of the communication connections including a wireless connection, and the control unit may decide that the first condition is satisfied when at least the wireless connection is disconnected. The mentioned configuration restricts the electronic apparatus from shifting to the power-off state when the wireless communication function is active.

In another aspect, the invention provides a control method of an electronic apparatus configured to operate in a normal mode and an energy-saving mode that consumes less energy than the normal mode. The control method includes causing the electronic apparatus to shift to a first energy-saving mode when a second condition for shifting to the first energy-saving mode is satisfied after a first condition for shifting to a power-off state is satisfied, shift to the power-off state when the second condition is not satisfied, maintain the first energy-saving mode without shifting to the power-off state even when the first condition is satisfied in the first energy-saving mode, and shift to the normal mode when a third condition is satisfied in the first energy-saving mode. Such a control method allows the electronic apparatus to maintain the first energy-saving mode instead of starting the power-off operation in the first energy-saving mode.

BRIEF DESCRIPTION OF THE DRAWINGS

The invention will be described with reference to the accompanying drawings, wherein like numbers reference like elements.

FIG. 3 is a flowchart showing an operation process of the printer according to the embodiment.

DESCRIPTION OF EXEMPLARY EMBODIMENT

Hereafter, an embodiment of the invention will be described with reference to the drawings. The following embodiment relates to a printer, an example of the electronic apparatus.

Figure 1:
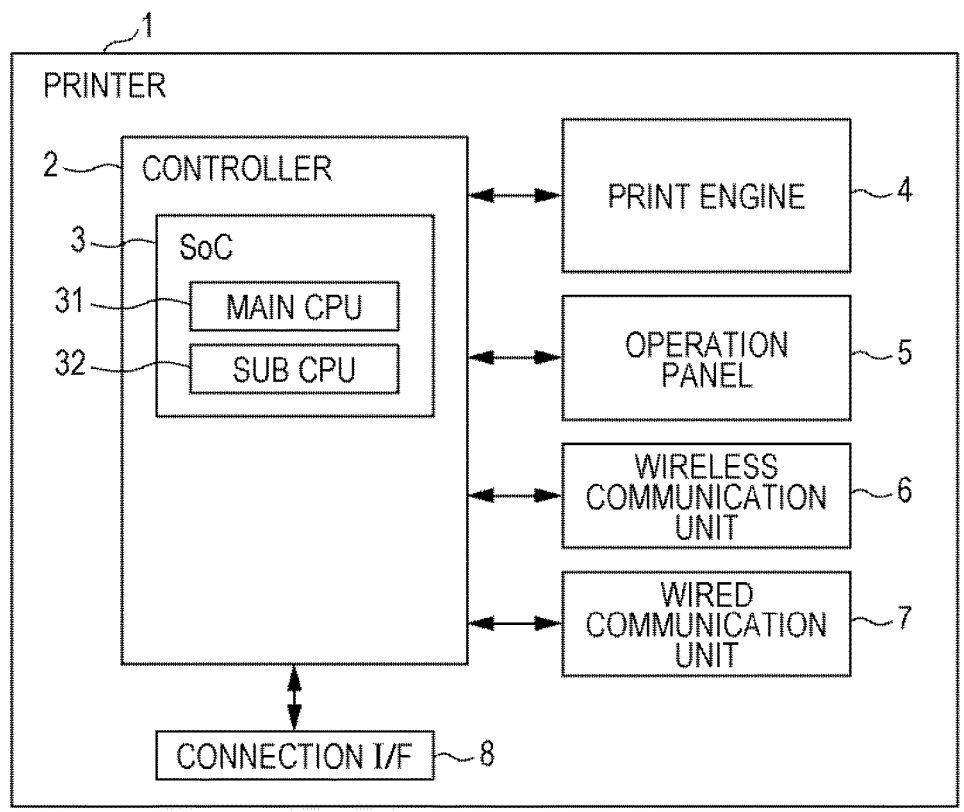
FIG. 1 is a block diagram showing a configuration of a printer according to an embodiment of the invention.

FIG. 1 is a block diagram showing a configuration of a printer according to an embodiment of the invention.

The printer 1 has both of an automatic power-off function and an automatic power-on function. The printer 1 starts to shift to the power-off state, for example when all communication connections are disconnected. In addition, the printer 1 shifts to the power-on standby mode when the automatic power-on function is active. These functions will be subsequently described in detail.

The printer 1 includes a controller 2 (corresponding to the control unit in the invention), a print engine 4, an operation panel 5, a wireless communication unit 6, a wired communication unit 7, and a connection interface (I/F) 8.

The controller 2 controls the operation of the printer 1 in an integrated manner. The controller 2 may be constituted of a computer including, for example, a system on a chip (SoC) 3 including an arithmetic unit such as a central processing unit (CPU), a volatile storage device such as a random-access memory (RAM), a non-volatile storage device such as a read-only memory (ROM), an interface circuit connecting between the controller 2 and other units, and a bus for connecting the mentioned units to one another. As a matter of course, the controller 2 may include various processing circuits such as an image processing circuit. The SoC 3 includes, for example, a main CPU 31 and a sub CPU 32. The sub CPU 32 may be smaller in circuit scale than the main CPU 31, and may operate with lower power consumption than the main CPU 31.

At least a part of the functions of the controller 2 may be realized by the CPU upon reading out one or more of programs stored in the ROM into the RAM and executing the program(s). The programs may be read out from a portable storage medium and installed in the printer 1, or downloaded from a server on a network and installed in the printer 1. At least a part of the functions of the controller 2 may be realized, for example, by a processing circuit such as an image processing circuit. At least a part of the functions of the controller 2 may be realized, for example, by both of the CPU and the processing circuit.

The print engine 4 forms an image on a printing medium in accordance with an instruction from the controller 2.

The print engine 4 may be configured to perform ink jet printing, laser printing, and so forth, and may include mechanical parts, sensors, motors, a drive circuit, a control circuit, and so forth.

The operation panel 5 receives an inputting operation made by a user and outputs an operation signal based on the input to the controller 2. The operation panel 5 also displays a processing result of the controller 2 in a form of an image representing characters, a graph, a table, animation, and so forth. The operation panel 5 may audibly output the processing result of the controller 2. The operation panel 5 may be composed of an input device such as keys, a touch sensor, or a touch panel, and an output device such as a liquid crystal display (LCD), an organic electro-luminescence display (OLED), or a speaker.

The wireless communication unit 6 is a communication module having a communication function conforming to, for example, the Wi-Fi standard which is a wireless LAN standard. The controller 2 can communicate with an external apparatus such as a personal computer (PC), through the wireless communication unit 6.

The wired communication unit 7 is a communication module having a communication function conforming to, for example, a wired LAN standard. The controller 2 can communicate with an external apparatus such as a PC, through the wired communication unit 7.

The connection I/F 8 is an interface device that enables connection and communication based on a universal serial bus (USB) standard. The controller 2 can make access to a device connected to the connection I/F 8 (e.g., a storage medium including a flash ROM) and read out information from the device, through the connection I/F 8.

The printer 1 according to this embodiment is configured to operate in a plurality of operation states (operation modes). The operation states include the following four, cited in the order of the amount of power consumption.

An idling mode (1) (corresponding to the normal mode in the invention), a sleep mode (2) (corresponding to the second energy-saving mode in the invention), a power-on standby mode (3) (corresponding to the first energy-saving mode in the invention), and a power-off mode (4) (corresponding to the power-off state in the invention).

In the idling mode (1), for example, the printer 1 is ready to perform a printing operation upon receipt of a print instruction. Power from the power source is supplied to, for example, the controller 2, the print engine 4, the operation panel 5, the wireless communication unit 6, the wired communication unit 7, and the connection I/F 8, and these components are ready for immediate use.

In the sleep mode (2), for example, some of the components of the printer 1 are set to an energy-saving state. For example, the print engine 4 and the operation panel 5 are set to the energy-saving state. For example, a part of the mechanism of the print engine 4 is turned off. In the operation panel 5, for example the backlight of the display is turned off.

In the power-on standby mode (3), for example, some of the components of the printer 1 are set to the power-off state, and the main CPU 31 is also set to the power-off state. For example, the print engine 4, the operation panel 5, the storage device of the controller 2 such as the RAM, and the main CPU 31 are set to the power-off state. The wireless communication unit 6, the wired communication unit 7, and the connection I/F 8 are set, for example, to the energy-saving state. In the power-on standby mode (3) the sub CPU 32 is activated, and monitoring the operation of predetermined buttons such as the power button, predetermined signals outputted from the wireless communication unit 6 or wired communication unit 7 (e.g., signal outputted according to a wakeup signal from the LAN), and connection and disconnection of a device to the connection I/F 8.

In the power-off mode (4), the power to the printer 1 is turned off. The printer 1 is activated for example when a predetermined button such as the power button is operated, and returns to the idling mode (1).

The wireless communication function of the printer 1 may be activated or cancelled as desired. When the wireless communication function is inactive, the wireless communication unit 6 is set, for example, to the power-off state in the idling mode (1) and the sleep mode (2). The wired communication function of the printer 1 may also be activated or cancelled as desired. When the wired communication function is inactive, the wired communication unit 7 is set, for example, to the power-off state in the idling mode (1) and the sleep mode (2). The function of the connection I/F 8 may be activated or cancelled as desired. When the function of the connection I/F 8 is inactive, the connection I/F 8 is set, for example, to the power-off state in the idling mode (1) and the sleep mode (2).

The SoC 3 controls the transition between the mentioned operation modes of the printer 1. Further details on this point will be subsequently described.

Figure 2:
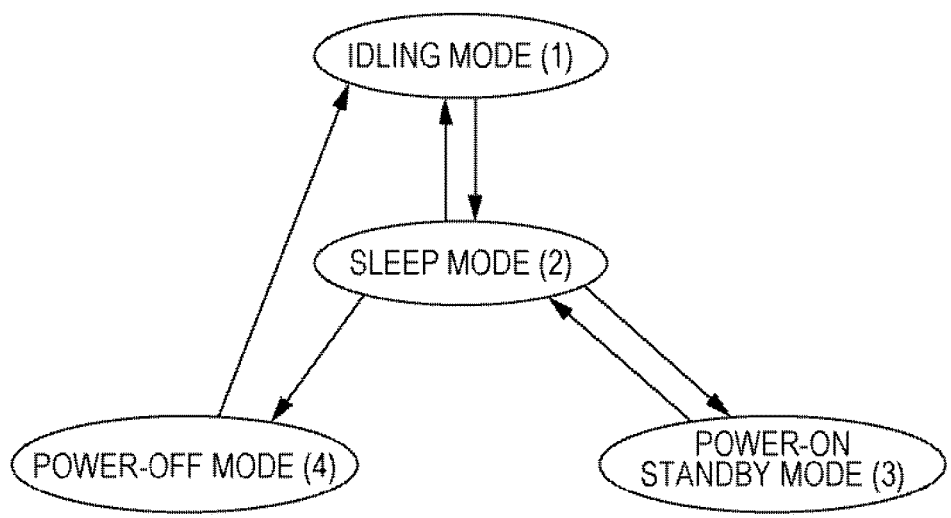
FIG. 2 is a transition chart showing an example of transition between operation states of the printer according to the embodiment.

FIG. 2 is a transition chart showing an example of the transition between the operation modes of the printer.

The transition between the idling mode (1) and the sleep mode (2) can be made in both ways. The transition between the sleep mode (2) and the power-on standby mode (3) can be made in both ways. The transition to the power-off mode (4) can be made from the sleep mode (2). The transition to the power-off mode (4) may also be made from the idling mode (1). The transition to the idling mode (1) can be made from the power-off mode (4). The transition to the power-off mode (4) is unable to be made from the power-on standby mode (3).

FIG. 3 is a flowchart showing an operation process of the printer. FIG. 3 illustrates the process performed by the controller 2 to control the transition between the operation modes of the printer 1. FIG. 3 represents the case where the automatic power-off function is activated, and the automatic power-on function is either activated or cancelled.

When the power to the printer 1 is turned on, the controller 2 shifts to the idling mode (1) (step S1). For example, the power is supplied to the controller 2, the print engine 4, the operation panel 5, the wireless communication unit 6, the wired communication unit 7, and the connection I/F 8, so that these components are activated. When the wireless communication function is inactive, the wireless communication unit 6 is set, for example, to the power-off state. When the wired communication function is inactive, the wired communication unit 7 is set, for example, to the power-off state. When the function of the connection I/F 8 is inactive, the connection I/F 8 is set, for example, to the power-off state.

In the idling mode (1), the controller 2 monitors events (step S2). For example, the main CPU 31 monitors a processing request such as a print instruction, as an event. When a processing request is detected (Y at step S2), the main CPU 31 executes the processing (e.g., printing operation) according to the processing request, and continues with the monitoring. In contrast, in the case where a processing request has not been detected for a predetermined time (e.g., five minutes) (N at step S2), the main CPU 31 proceeds to step S3.

In the case where an event has not been detected for the predetermined time (N at step S2), the controller 2 shifts to the sleep mode (2) (step S3). For example, the main CPU 31 sets some of the components of the printer 1 to the energy-saving state, as mentioned earlier.

In the sleep mode (2), the controller 2 monitors the events (step S4). For example, the main CPU 31 monitors a processing request such as a print instruction, as an event. When a processing request is detected (Y at step S4), the main CPU 31 proceeds to step S5. In the case where a processing request has not been detected (N at step S4), the main CPU 31 proceeds to step S6.

When an event is detected (Y at step S4), the controller 2 shifts to the idling mode (1) (step S5). For example, the main CPU 31 sets some of the components of the printer 1, currently in the energy-saving state, to the normal mode. Then the main CPU 31 executes the processing (e.g., printing operation) according to the event detected at step S4, and returns to step S2.

In the case where no events have been detected (N at step S4), the controller 2 decides whether the communication connection is disconnected (step S6).

The automatic power-off function according to this embodiment is arranged so as to turn off the power to the printer 1 when all the communication connections (wireless connection of the wireless communication unit 6, wired connection of the wired communication unit 7, and device connection to the connection I/F 8) are disconnected for a predetermined time (e.g., 30 minutes).

The state in which the wireless connection is disconnected refers to, for example, the case where the wireless communication function is inactive, so that the wireless communication unit 6 is physically disabled to transmit or receive a signal. The state in which the wired connection is disconnected refers to, for example, the case where the wired communication function is inactive, so that the wired communication unit 7 is physically disabled to transmit or receive a signal, or where the wired communication function is active but the LAN cable is not connected to the wired communication unit 7. The state in which the device connection is disconnected refers to, for example, the case where the function of the connection I/F 8 is inactive, so that the connection I/F 8 is physically disabled to transmit or receive a signal, or where the function of the connection I/F 8 is active but no device is connected thereto.

For example, the main CPU 31 makes a decision on the basis of the state of all the communication connections. Upon deciding that any of the communication connections are not disconnected (N at step S6), the main CPU 31 proceeds to step S4. In contrast, upon deciding that all the communication connections have been disconnected for the predetermined time (Y at step S6), the main CPU 31 proceeds to step S7.

Upon deciding that all the communication connections have been disconnected for the predetermined time (Y at step S6), the controller 2 starts the power-off operation (step S7). For example, the main CPU 31 sets some of the components of the printer 1 to the power-off state.

After the power-off operation is started, the controller 2 decides whether the automatic power-on function is active (step S8). For example, the main CPU 31 looks up setup information stored in the storage devices such as the RAM or ROM, to thereby decide whether the automatic power-on function is activated.

When the automatic power-on function is inactive (N at step S8), the controller 2 shifts to the power-off mode (4) (step S9). For example, the main CPU 31 sets all the components of the printer 1 to the power-off state, including the main CPU 31 itself.

When the automatic power-on function is active (Y at step S8), the controller 2 shifts to the power-on standby mode (3) (step S10). For example, the main CPU 31 sets some of the components of the printer 1 to the power-off state, including the main CPU 31 itself. At this point, the main CPU 31 sets the wireless communication unit 6, the wired communication unit 7, and the connection I/F 8 to the energy-saving state.

In the power-on standby mode (3), the controller 2 monitors the events (step S11). For example, the sub CPU 32 monitors, as an event, whether a predetermined signal has been outputted from the wireless communication unit 6 or the wired communication unit 7. In addition, the sub CPU 32 monitors, as an event, whether a predetermined button, for example the power button, has been operated by the user. For example, further, the sub CPU 32 monitors connection and disconnection of a device to and from the connection I/F 8, as an event. At step S11, the decision whether the communication connection is disconnected, as made at step S6, is not made. While no events are detected (N at step S11), the sub CPU 32 continues with the operation of step S11.

When an event is detected (Y at step S11), the controller 2 shifts to the sleep mode (2) (step S12). For example, the sub CPU 32 activates the main CPU 31. In addition, for example, the activated main CPU 31 activates some of the components of the printer 1, thus far set to the power-off state, to set those components to the energy-saving state. The activated main CPU 31 also sets the wireless communication unit 6, the wired communication unit 7, and the connection I/F 8 to the normal mode.

The controller 2 then shifts to the idling mode (1) (step S13).

For example, the main CPU 31 sets some of the components of the printer 1, thus far set to the energy-saving state, to the normal mode. Then the main CPU 31 returns to step S2.

The embodiment of the invention is configured as described above. For example, the printer 1 according to this embodiment shifts to the power-on standby mode (3), in the case where the automatic power-on function is active when the printer 1 is about to shift to the power-off mode (4). In addition, in the power-on standby mode (3) the printer 1 does not make a decision about the disconnection of any of the communication connections. Therefore, the printer 1 can remain in the power-on standby mode (3) without starting the power-off operation, regardless that all the communication connections are disconnected in the power-on standby mode (3). In addition, the printer 1 can properly execute the automatic power-on function, when both of the automatic power-off function and the automatic power-on function are active.

For example, the printer 1 shifts to the power-off mode (4) when all the communication connections are disconnected. Accordingly, the printer 1 provides a highly convenient function of shifting to the power-off state upon being disabled to receive the processing requests such as the print instruction.

For example, the printer 1 shifts to the power-on standby mode (3) in the case where the automatic power-on function is active when the printer 1 is about to shift to the power-off mode (4). Therefore, the printer 1 can properly execute the automatic power-on function, when both of the automatic power-off function and the automatic power-on function are active.

For example, the printer 1 shifts to the idling mode (1) upon receipt of a request from an external apparatus or an input made by the user, in the power-on standby mode (3). Therefore, the printer 1 can stand by for a request with low-power consumption.

For example, further, the printer 1 shifts to the sleep mode (2) and decides whether a predetermined transition condition is satisfied, before shifting to the power-on standby mode (3) or the power-off mode (4). Therefore, the printer 1 can make the decision with low-power consumption, before shifting to the power-on standby mode (3) or the power-off mode (4).

For example, further, the printer 1 shifts to the power-off mode (4) when the communication connection of the wireless communication unit 6 is disconnected. Therefore, the printer 1 can be kept from shifting to the power-off mode (4) while the wireless communication function is active.

The invention is not limited to the foregoing embodiment, but may be modified in various manners within the scope of the invention. For example, the foregoing embodiment may be modified as described hereunder. In addition, two or more of the embodiment and the variations may be combined as desired.

The communication connection is not limited to the mentioned three components (wireless communication unit 6, wired communication unit 7, and connection I/F 8). For example, the communication connection may include a communication unit used for facsimile communication. In addition, the number of communication connections is not limited to three, but may be one, two, or four or more.

For example, the controller 2 may decide whether one or more predetermined communication connections (e.g., wireless connection and wired connection), not all the communication connections, are disconnected, at step S6. The predetermined communication connections may be selected by the user.

For example, the controller 2 may proceed to step S8 immediately after step S6, and execute the operation of step S7 when the automatic power-on function is inactive (N at step S8).

For example, when the automatic power-on function is active (Y at step S8), the controller 2 may once shift to the power-off mode (4), and then be reactivated and shift to the power-on standby mode (3) through the idling mode (1) and the sleep mode (2). In this case, the transition from the idling mode (1) to the sleep mode (2) may be made without making the decision about the transition condition, such as the predetermined time (e.g., five minutes). In addition, the transition from the sleep mode (2) to the power-on standby mode (3) may be made without making the decision about the transition condition, such as the setting of the automatic power-on function.

The aforementioned configuration of the printer 1 according to the embodiment is classified according to the corresponding process, for the sake of the clarity of the description. Accordingly, the invention is not limited by the way of classification or naming of the components. The configuration of the printer 1 may be classified into a larger number of components depending on the operations to be performed. Alternatively, one of the components may be set to execute additional operations. The operations of the components may be realized by a single piece of hardware, or a plurality of pieces of hardware. Further, the assignment of the operations and functions of the components is not limited to the foregoing embodiment, provided that the advantageous effects of the invention can be attained.

The steps of the flowchart according to the embodiment are arranged according to the corresponding process, so as to facilitate the understanding about the operation of the printer 1. Accordingly, the invention is not limited by the way of arrangement of the steps or the description thereof. The operation of the printer 1 may be divided into a larger number of steps depending on the operations to be performed. Alternatively, one of the steps may be arranged to execute additional operations. Further, the operation sequence is not limited to the flowchart described above.

The electronic apparatus according to the invention is not limited to the printer. The electronic apparatus may include apparatuses configured to assume a plurality of operation modes, such as a scanner, a multi-function printer, a projector, a TV set, a video recorder, and so forth.

In the present disclosure, the standby state (normal mode) may be denoted as a first state, or the sleep mode (second energy-saving mode) may be denoted as the first state. In addition, the second energy-saving mode may be denoted as a second energy-saving state in the disclosure.

In the disclosure, the power-on standby mode (first energy-saving mode) may be denoted as a second state. The first energy-saving mode may be denoted as the second energy-saving state in the disclosure.

The power-off state may be denoted as a third state, in the disclosure.

The printer 1 according to the foregoing embodiment may be configured to operate in a third energy-saving state (third energy-saving mode) that consumes less energy than the power-on standby mode (first energy-saving mode).

Here, the third energy-saving state refers to a state in which, for example, the power from the power source to a part of the mechanism of the print engine 4, the backlight of the display in the operation panel 5, the main CPU 31, and the sub CPU 32 is disconnected, and the power is being supplied to some of the remaining components. Some of the remaining components include, for example, the LED light provided in the printer, and components mounted in the SoC 3 other than the sub CPU 32.

The third energy-saving state (third energy-saving mode) may be denoted as the third state, in the disclosure.

The printer 1 according to the foregoing embodiment may include a switch for activating or cancelling the automatic power-on function, and a second switch for activating or cancelling the automatic power-off function. Here, the automatic power-on function refers to a function to control the power supply from the power source to the modules of the printer 1 to thereby enable the printer 1 to execute the printing operation, when the main CPU 31 detects occurrence of a predetermined event. The automatic power-off function refers to a function to disconnect the power supply from the power source to the printer 1. The switch and the second switch may be operation buttons provided on the printer 1, or software switches displayed on the operation panel 5 (operation image serving as a switch). Alternatively, the switch and the second switch may be, for example, circuit switches incorporated as parts in the SoC or an application-specific integrated circuit (ASIC).

In the disclosure, the main CPU 31 may be denoted as a processor, and the sub CPU 32 may be denoted as a sub processor.

The main CPU 31 may shift the printer 1 from the first state to the second state, in the case where, when the printer 1 is in the first state, a state transition condition for shifting the printer 1 to another state that consumes less energy than the first state is satisfied, and the automatic power-on function is active. In addition, the main CPU 31 may shift the printer 1 from the first state to the third state, in the case where, when the printer 1 is in the first state, the mentioned state transition condition is satisfied and the automatic power-on function is inactive.

A state where at least one of the plurality of communication units (e.g., wireless communication unit 6 and wired communication unit 7) is disabled to establish communication with an external device may be adopted as one of the state transition conditions.

The main CPU 31 may shift the printer 1 from the first state to the second state, in the case where the foregoing state transition condition is satisfied and the automatic power-on function is active, when the printer 1 is in the first state and the automatic power-off function is active. In addition, the main CPU 31 may shift the printer 1 from the first state to the third state to thereby disconnect the power from the power source to the printer 1, in the case where the foregoing state transition condition is satisfied and the automatic power-on function is inactive, when the printer 1 is in the first state and the automatic power-off function is active.

The main CPU 31 may restrict the printer 1 from shifting to the third state, when the printer 1 is in the second state.

The sub CPU 32 may monitor the occurrence of at least one of an operation event in which the operation unit is operated, a reception event in which the communication unit (wireless communication unit 6 or wired communication unit 7) receives a wake-up signal from an external device, and a connection event in which an external device is connected to the connection I/F 8, and notify, upon detecting the occurrence of any of the mentioned events, the main CPU 31 to this effect. The main CPU 31 may shift the printer 1 from the second state to the first state, according to the notice. Here, the operation unit referred to above includes, for example, an operation button provided on the operation panel 5 or the printer 1.

The main CPU 31 (processor) according to the foregoing embodiment may include one or a plurality of integrated circuits. The main CPU 31 may include, for example, one or a plurality of CPUs, one or a plurality of ASICs, or a combination thereof. The sub CPU 32 (sub processor) according to the embodiment may include one or a plurality of integrated circuits. The sub CPU 32 may include, for example, one or a plurality of CPUs, one or a plurality of ASICs, or a combination thereof.

The entire disclosure of Japanese Patent Application No. 2016-074037, filed Apr. 1, 2016 is expressly incorporated by reference herein.

What is claimed is:

1. An electronic apparatus configured to operate in a first state which includes either an idling mode or a sleep mode, a second state that consumes less energy than the first state and that includes a power-on standby mode, and a third state that includes a power-off mode and that consumes less energy than the second state, the electronic apparatus comprising:
    a switch that activates or cancels an automatic power-on function of the electronic apparatus; and
    a controller that (i) shifts the electronic apparatus from the first state to the second state, in a case where, when the electronic apparatus is in the first state, a state transition condition for shifting the electronic apparatus to another state that consumes less energy than the first state is satisfied, and the automatic power-on function is active, and (ii) shifts the electronic apparatus from the first state to the third state, in a case where the state transition condition is satisfied and the automatic power-on function is inactive,
    wherein, in a case when (1) the controller had previously shifted to the power-off mode, (2) the automatic power-on function is now active, and (3) the controller is subsequently reactivated, the controller is shifted to the power-on standby mode by first transitioning to the idling mode and then to the sleep mode without determining whether the state transition condition is satisfied and then subsequently transitioning from the sleep mode to the power-on standby mode also without determining whether the state transition condition is satisfied.

2. The electronic apparatus according to claim 1, wherein the automatic power-on function includes controlling power supply from a power source to modules of the electronic apparatus thereby enabling the electronic apparatus to execute a printing operation, when the controller detects occurrence of a predetermined event.

3. The electronic apparatus according to claim 1, further comprising a plurality of communication units, wherein the state transition condition includes a state in which at least one of the plurality of communication units is disabled to establish communication with an external device.

4. The electronic apparatus according to claim 3, further comprising a second switch that activates or cancels an automatic power-off function including disconnecting power supply from a power source to the electronic apparatus when the state transition condition is satisfied,
    wherein the third state includes a state in which the power supply from the power source to the electronic apparatus is disconnected, and
    the controller shifts the electronic apparatus from the first state to the second state, in a case where the state transition condition is satisfied and the automatic power-on function is active, when the electronic apparatus is in the first state and the automatic power-off function is active, and shifts the electronic apparatus from the first state to the third state to thereby disconnect the power supply from the power source to the electronic apparatus, in a case where the state transition condition is satisfied and the automatic power-on function is inactive.

5. The electronic apparatus according to claim 1, wherein the controller restricts the electronic apparatus from shifting to the third state, when the electronic apparatus is in the second state.

6. The electronic apparatus according to claim 1, further comprising:
   a sub processor activated by power supply from a power source in the second state;
   a communication unit including an operation panel or an operation button; and
   a USB connection interface,
   wherein the sub processor monitors occurrence of at least one of an operation event in which the operation panel is operated, a reception event in which the communication unit receives a wake-up signal from an external device, and a connection event in which the external device is connected to the USB connection interface and, upon detecting occurrence of any of the events, notifies the controller of the detection, and
   the controller shifts the electronic apparatus from the second state to the first state, according to the notification.

7. The electronic apparatus according to claim 1, further comprising an electronic apparatus module including at least one of a print engine and an operation panel,
   wherein the first state includes a state in which power from a power source is supplied to the electronic apparatus module, the controller which includes a processor and a sub processor, and a first energy-saving state in which the power from the power source to the electronic apparatus module is disconnected and the power from the power source is supplied to the processor and the sub processor,
   the second state includes a second energy-saving state in which the power from the power source to the electronic apparatus module and the processor is disconnected and the power from the power source is supplied to the sub processor, and
   the third state includes a third energy-saving state in which the power from the power source to the electronic apparatus module, the processor, and the sub processor is disconnected, and a power-off state in which the power from the power source to the electronic apparatus is disconnected.

8. A control method of an electronic apparatus configured to operate in a first state which includes either an idling mode or a sleep mode, a second state that consumes less energy than the first state and that includes a power-on standby mode, and a third state that includes a power-off mode and that consumes less energy than the second state, the control method comprising:
   causing a switch to activate or cancel an automatic power-on function of the electronic apparatus; and
   causing a controller to (i) shift the electronic apparatus from the first state to the second state, in a case where, when the electronic apparatus is in the first state, a state transition condition for shifting the electronic apparatus to another state that consumes less energy than the first state is satisfied, and the automatic power-on function is active, and (ii) shift the electronic apparatus from the first state to the third state, in a case where the state transition condition is satisfied and the automatic power-on function is inactive,
   wherein, in a case when (1) the controller had previously shifted to the power-off mode, (2) the automatic power-on function is now active, and (3) the controller is subsequently reactivated, the controller is shifted to the power-on standby mode by first transitioning to the idling mode and then to the sleep mode without determining whether the state transition condition is satisfied and then subsequently transitioning from the sleep mode to the power-on standby mode also without determining whether the state transition condition is satisfied.

* * * * *